(12) United States Patent
Mayer et al.

(10) Patent No.: US 7,806,582 B2
(45) Date of Patent: Oct. 5, 2010

(54) ILLUMINATING MODULE FOR MOUNTING IN A DOMESTIC APPLIANCE AND DOMESTIC APPLIANCE WITH SUCH A MODULE

(75) Inventors: Herbert Mayer, Bad Abbach (DE); Roland Vetter, Giengen-Sachsenhausen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 76 days.

(21) Appl. No.: 10/592,824

(22) PCT Filed: Mar. 9, 2005

(86) PCT No.: PCT/EP2005/051064

§ 371 (c)(1), (2), (4) Date: Oct. 31, 2006

(87) PCT Pub. No.: WO2005/091025

PCT Pub. Date: Sep. 29, 2005

(65) Prior Publication Data

US 2007/0195537 A1   Aug. 23, 2007

(51) Int. Cl.
*F21V 7/04* (2006.01)
*F21V 33/00* (2006.01)

(52) U.S. Cl. .............. 362/632; 362/602; 362/603; 362/604; 362/610; 362/612; 362/613; 362/623; 362/625; 362/626; 362/89; 362/27; 362/92

(58) Field of Classification Search ............. 362/616, 362/612, 610, 613, 623, 625, 626, 27
See application file for complete search history.

(56) References Cited

U.S. PATENT DOCUMENTS

| 4,679,044 A | 7/1987 | Knoll |
| 6,164,789 A * | 12/2000 | Unger et al. ............. 362/610 |
| 6,892,485 B2 | 5/2005 | Geyer |
| 7,021,812 B2 * | 4/2006 | Maeda et al. ............ 362/608 |
| 2001/0038532 A1 * | 11/2001 | Harbers et al. ............ 362/31 |
| 2003/0209018 A1 * | 11/2003 | Becke et al. ............. 62/126 |
| 2005/0122744 A1 | 6/2005 | Sakuda et al. |
| 2006/0089732 A1 | 4/2006 | Range |

FOREIGN PATENT DOCUMENTS

| DE | 33 31 724 A1 | 3/1985 |
| DE | 92 07 911.3 U1 | 10/1992 |
| DE | 41 42 175 A1 | 6/1993 |
| DE | 43 31 682 A1 | 3/1995 |

(Continued)

*Primary Examiner*—Sandra L O'Shea
*Assistant Examiner*—Sean P Gramling
(74) *Attorney, Agent, or Firm*—Laurence A. Greenberg; Werner H. Stemer; Ralph E. Locher

(57) ABSTRACT

A luminous module for mounting in a household appliance has a housing that is embodied in such a way as to receive a luminous element. The luminous module further contains a first optical wave guide having a light admission surface via which light emitted by the luminous element enters the first optical wave guide, and a light output surface via which the light emerges from the luminous module. The housing is embodied in such a way as to alternatively receive a first luminous element and a second luminous element that is different from the first.

17 Claims, 6 Drawing Sheets

FOREIGN PATENT DOCUMENTS

| | | |
|---|---|---|
| DE | 198 16 988 A1 | 10/1999 |
| DE | 298 04 817 U1 | 10/1999 |
| DE | 100 64 118 A1 | 6/2002 |
| DE | 102 34 023 A1 | 2/2004 |
| DE | 102 36 718 A1 | 2/2004 |
| EP | 0 644 373 A2 | 3/1995 |
| EP | 0 944 147 A1 | 9/1999 |
| EP | 1 385 185 A2 | 1/2004 |
| JP | 2000019513 A | 1/2000 |
| WO | 03/069220 A1 | 8/2003 |

* cited by examiner

ILLUMINATING MODULE FOR MOUNTING IN A DOMESTIC APPLIANCE AND DOMESTIC APPLIANCE WITH SUCH A MODULE

BACKGROUND OF THE INVENTION

Field of the Invention

This invention relates to an illuminating module for mounting in a domestic appliance with a housing which is designed for receiving an illuminating element, and in which is arranged a first light conductor which has a light admission surface through which light escaping from the illuminating element enters the first light conductor, and which has a light exit surface from the light escapes from the illuminating module.

Such an illuminating module is disclosed in DE 100 64 118 A1, which describes a domestic appliance with a trademark in which the trademark consists of a structural element or an assembly of a transparent or translucent material, and which is connected to at least one light source fitted on the inside of the housing in such a manner that the outer surface of the trademark radiates light in the forward direction when the light source is switched on. The illuminating module of prior art must be produced specially for the application, which in a multiplicity of domestic appliance variants results in an equally large number of illuminating module variants to be specially produced.

SUMMARY OF THE INVENTION

The object of this invention is to indicate a universally low cost illuminating module for mounting in a domestic appliance.

This object is achieved by an illuminating module with the features of Claim 1.

The illuminating module has a housing which is designed for receiving an illuminating element. In the housing is arranged a first light conductor of transparent or translucent material which has a light admission surface and a light exit surface. Light escaping from the illuminating element enters the light admission surface and is admitted to the first light conductor, and the light escapes from the light exit surface and from the illuminating module. Because the housing is designed for alternately receiving a first illuminating element and a second illuminating element that is different from the first element, the illuminating module can be equipped with an illuminating element that is optimised to the situation without its housing having to be modified.

In the illuminating module the first illuminating element may have at least one second light conductor. The illuminating module may therefore be used as a passive illuminating module on positions in a domestic appliance on which an electrical power supply is not desirable or not possible.

Furthermore, the second illuminating element may have a support plate, in particular a circuit circuit board, with at least one light source, so that light can be generated directly in the illuminating module. The illuminating module may therefore be used as an active illuminating module on positions on which a power supply is possible without problem.

At least one functional element is formed on the housing of the illuminating module. The functional element can be formed easily and inexpensively on the housing. The functional element can be formed particularly easily and inexpensively on the housing if the housing and the functional element are produced in one piece from the same plastic.

In particular, the functional element as a stop element with which the first light conductor and/or the first illuminating element and/or the second illuminating element is releasably secured in the housing and/or with which the illuminating module can releasably secured with a module receiving device. The illuminating module may therefore be equipped extremely easily with different first light conductors to enable different indications to be displayed. For example, the first light conductors are distinguished by differently designed light exit sides which display different symbols or letters which can be moulded into the light exit side, formed on the light exit side or impressed upon the light exit side. The different symbols or letters may also be formed at other points on the first light conductor instead of on the light exit side, e.g. on a side opposite the light exit side or in the volume of the first light conductor. On the insides of the housing at least one further stop element can be formed with which the first and/or the second illuminating element can be secured in the housing. The stop element is designed particularly advantageously so that both a circuit board with one or a plurality of light emitting diodes and, as an alternative to this, a second light conductor can be secured in the housing. On the one hand the illuminating module can be designed as an active illuminating module with its own light source, and on the other it can be designed as a passive illuminating module with light from a remote light source directed into the illuminating module. On the outside of the housing can be formed at least one further stop element with which the illuminating module can be secured in a module receiving device of the domestic appliance. The connection between the illuminating module and the module receiving device may therefore easily be loosened again and the illuminating module can be removed from the module receiving device so that it can be exchanged, for example, for another module or so that individual components of the illuminating module can be replaced.

The functional element is advantageously designed so that it is spring-mounted. In particular, the housing has a spring mounting for the first and/or second illuminating element so that the first and/or the second illuminating element can easily be mounted in the housing by bending the spring mounting from its position of test.

In a preferred embodiment the housing has at least one light reflecting inner surface. The luminosity of the illuminating module can therefore be increased since light which falls onto the reflecting inner surface of the housing is reflected instead of absorbed by it and is therefore continues to be available for radiation from the illuminating module.

The first light conductor is advantageously designed in the shape of a parallelepiped and, in particular, has a light exit surface which is perpendicular to the light admission surface. The first light conductor can therefore be manufactured inexpensively and assembled in the housing particularly easily.

According to a preferred embodiment the first illuminating element and/or the second illuminating element has direct contact with the light admission surface of the first light conductor, as a result of which the position of the coupling of the light from the first or second illuminating element into the first light conductor is extremely high.

In order to achieve as uniformly distributed light radiation over the light exit surface of the first light conductor as possible, the light exit surface and/or the surface of the first light conductor opposite the light exit surface has a structured surface. It is also possible to equip the light exit surface with a diffuser foil or to manufacture the first light conductor from diffuse material in order to obtain uniform light radiation.

The illuminating module can be secured releasably in a module receiving device of the domestic appliance, wherein the module receiving device is preferably arranged behind a screen of the domestic appliance. However, the module receiving device may also be arranged in front of or behind any other parts of the domestic appliance which are to be illuminated. For example, the module receiving device may be formed by stop hooks which are formed on the back of the screen and which engage in stop lugs of the illuminating module for mounting the illuminating module, which lugs are in turn formed on the housing of the illuminating module.

In particular, the screen may be a grip plate for an object that is movable on the domestic appliance, e.g. a detergent drawer or a door or a hood or flap of the domestic appliance. An optical display can be provided on these moving parts of the domestic appliance by using a second light conductor for feeding light into the illuminating module. An electrical connection for the illuminating module is difficult to obtain on these parts.

BRIEF DESCRIPTION OF THE DRAWINGS

The invention and its embodiments are explained in greater detail in the following with reference to drawings, in which

FIG. 1b, 1c each show an enlarged section of the illuminating module according to the invention from FIG. 1a;

FIG. 2b shows the second light conductor according to FIG. 2a;

FIG. 3b shows the circuit board according to FIG. 3a;

FIG. 4b shows a front view of the screen according to FIG. 4a;

FIG. 5a shows a front view of a domestic appliance with an assembled illuminating module according to FIG. 2a;

DESCRIPTION OF THE PREFERRED EMBODIMENTS

Figure 1A:
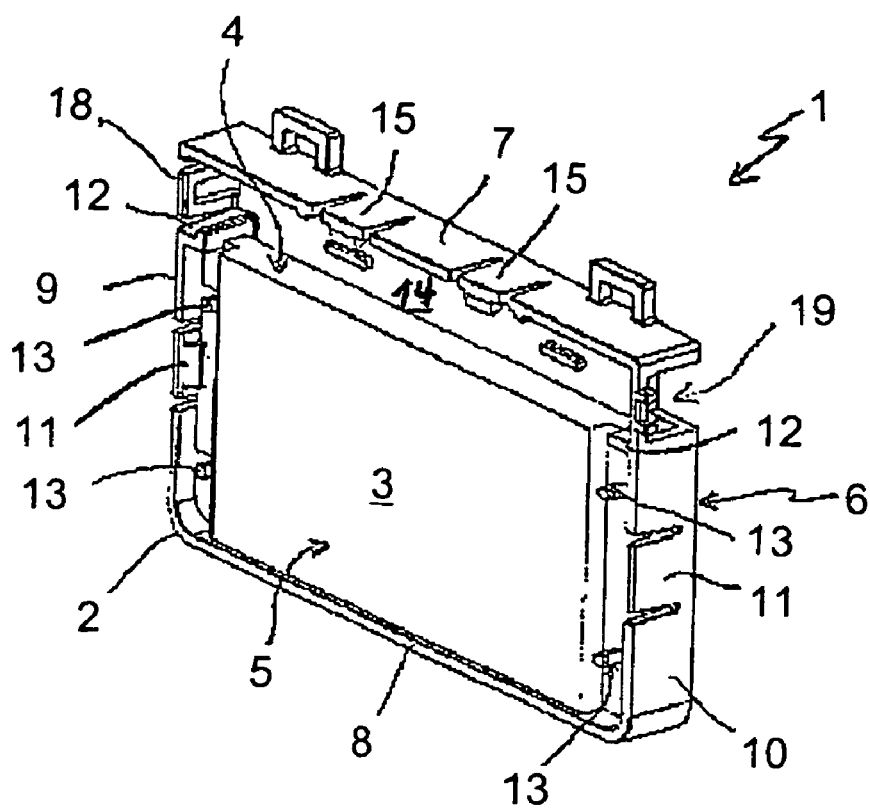
FIG. 1a shows a perspective view of an illuminating module without an illuminating element obliquely to the light exit surface.

FIG. 1a shows an illuminating module 1 according to the invention, with a housing 2 and with a first light conductor 3 arranged in housing 2. The first light conductor 3 is designed in the shape of a parallelepiped, and has a light admission surface 4 and a light exit surface 5, wherein light exit surface 5 is essentially perpendicular to light admission surface 4. Housing 2 comprises the first light conductor 3 with a rear wall 6 opposite light exit surface 5 of the first light conductor 3, with a first longitudinal wall 7 arranged adjacent to light admission surface 4, with a second longitudinal wall 8 opposite this first longitudinal wall 7, with a first transverse wall 9 connecting the first longitudinal wall 7 and the second longitudinal wall 8, and with a second transverse wall 10 opposite the first transverse wall 9. Housing 2 is designed so that it is open on light exit surface 5 of the first light conductor 3. The internal sides of housing 2, in particular that of rear wall 6 and the second longitudinal wall 8, may be designed so that they are light reflecting.

On the first transverse wall 9 and on the opposite second transverse wall 10 are formed stop elements 11 with which the first light conductor 3 is retained in housing 2. Furthermore, guiding elements 12 are formed on the first or second transverse wall 9, 10 for exact positioning of the first light conductor 3 in housing 2, and rear wall 6 has pins 13 formed on it which engage through recesses of the first light conductor 3, thereby determining the exact position of the first light conductor 3. Stop elements 11, guiding elements 12 and pins 13 are, in particular, formed in one piece on housing 2.

Figure 1B:
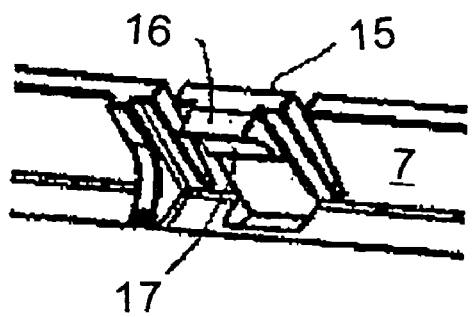
Figure 1C:
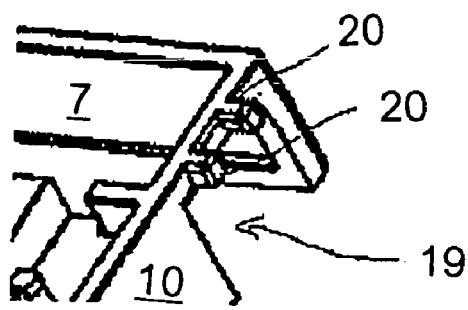

Inside housing 2 a receiving region 14 for receiving an illuminating element is formed between light admission surface 4 of the first light conductor and the first longitudinal wall 7 of housing 2 arranged adjacent to it, which illuminating element is able to supply illuminating module 1 with light. Two stop elements 15, for mounting the illuminating element, are formed on the first longitudinal wall 7 of housing 2. An enlarged representation of stop element 15 is shown in FIG. 1b. Stop element 15 is resiliently formed on housing 2 and has a stop nose 16 which is designed with an arc-shaped groove 17. Furthermore, a sprung mounting 18 is formed on the first transverse wall 9 of housing 2, which mounting can be bent from its position of rest when the illuminating element is assembled. Moreover, housing 2 has on its second transverse wall 10 a recess 19 through which the illuminating element can be threaded when mounted in receiving region 14. FIG. 1c shows an enlarged representation of the second transverse wall 10 with recess 19. On the outside of the second transverse wall 10 are formed, above recess 19, two retaining elements 20 with which an exact position of the illuminating element can be established in receiving region 14 when assembling the illuminating element in illuminating module 1.

Figure 2A:
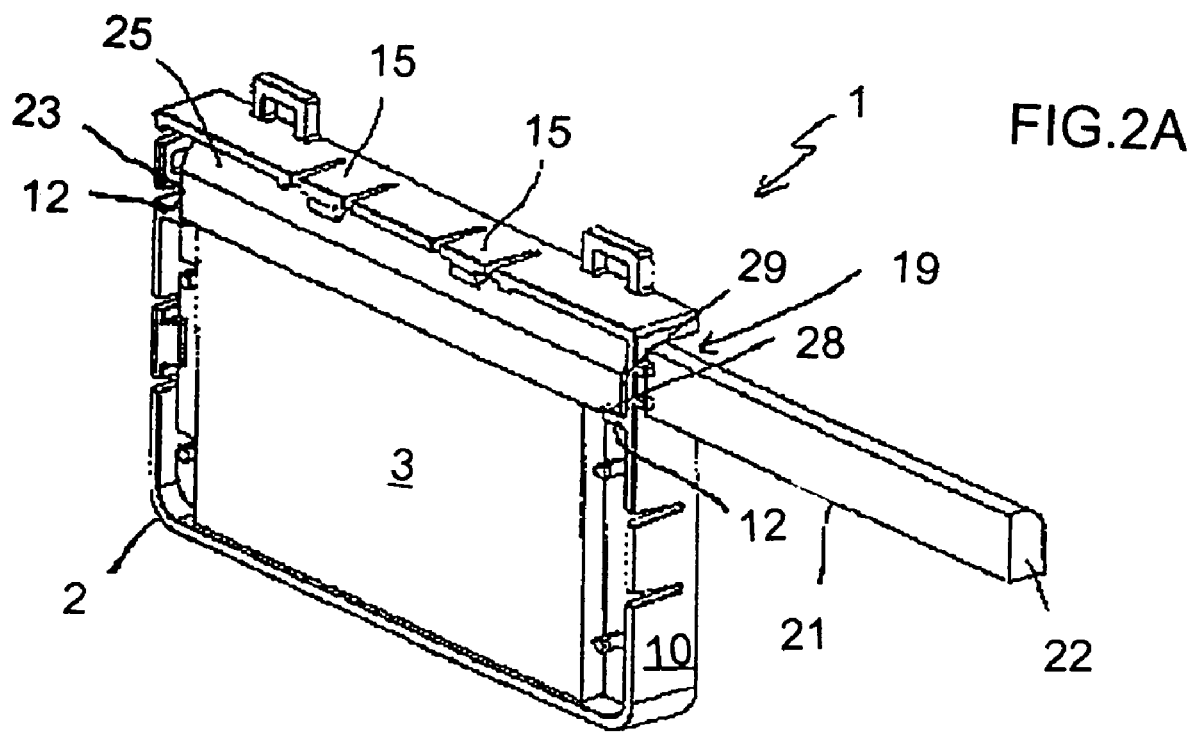
FIG. 2a shows the illuminating module from FIG. 1a with a second light conductor as illuminating element.
Figure 2B:
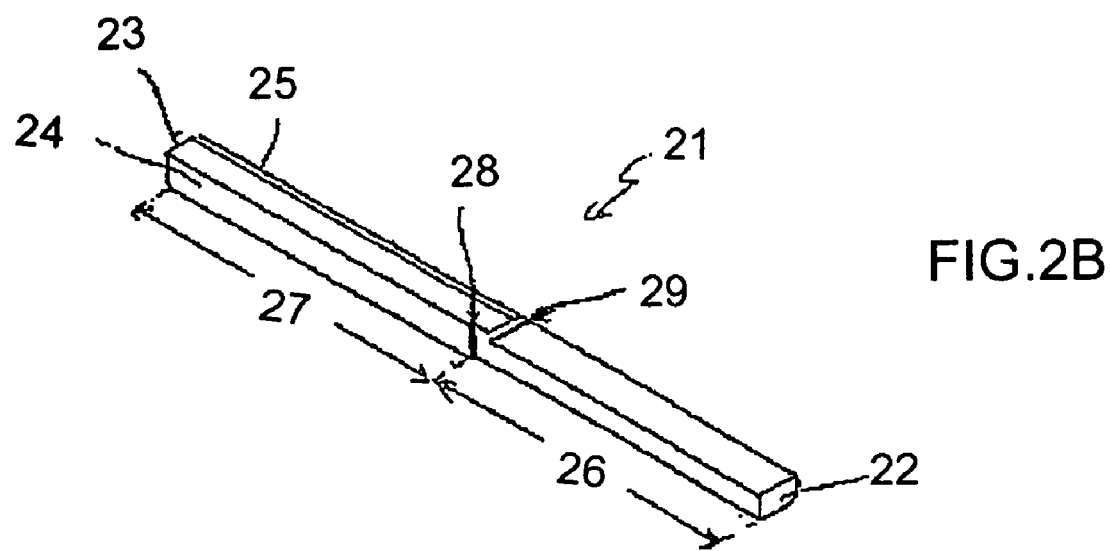

FIG. 2a shows illuminating module 1 according to FIG. 1a, with a second light conductor 21 mounted in receiving region 14, and FIG. 2b shows the second light conductor 21. The second light conductor 21 has a rod-shaped design and has a light coupling surface 22, an end face 23 opposite light coupling surface 22 and a light uncoupling surface 24 arranged at right angles to light coupling surface 22 or end face 23. The rear surface 25 of the second light conductor 21 opposite light uncoupling surface 24 has a curved design. Furthermore, the second light conductor 21 is divided into a light supply region 26 and a light discharge region 24. wherein the second light conductor 21 has a first step 28 between both these regions 26, 27, then on light supply region 26, a first step 28 and perpendicular to this a second step 29 whereby the second light conductor 21 can be retained in receiving region 14 of housing 2. The second light conductor 21 can be coated with a light reflecting and/or opaque coating, with the exception of light coupling surface 22 and light uncoupling surface 24, so that light which enters light coupling surface 22 of the second light conductor 21 from a light source (not shown) can only escape again from light uncoupling surface 24.

When the second light conductor is assembled in receiving region 14 of illuminating module 1 according to FIG. 1a and FIG. 2a, the second light conductor 21, with its light supply region 27, is threaded through recess 19 of housing 2 so that light supply region 27 projects laterally from housing 2. Stop elements 15 are bent from the position of rest and the second light conductor 21 is pushed into receiving region 14 so that light uncoupling surface 24 comes into direct contact with light admission surface 4 of the first light conductor 3. When the second light conductor is assembled stop elements 15 each solidly enclose the curved rear surface 25 of the second light conductor 21 with the arc-shaped groove 17 of their stop noses 16. The second light conductor 21 rests with its end face 23 and its first step 28 against guiding elements 12 of housing 2 and with its second step 29 on second transverse wall 10 above recess 19, and is in this manner fixed in receiving region 14 of housing 2.

The second light conductor 21 may have its own housing and may be manufactured, for example, as a two-component injection moulding. Furthermore, the second light conductor 21 may be composed of a plurality of second individual light conductors which are held together by a common housing, for example, or are inserted individually in receiving region 14 of illuminating module 1, and there retained. The second individual light conductors may be differently coloured in the case of light sources with the same light colouring. Moreover, the first light conductor 3 in housing 2 may also be composed of a plurality of first individual light conductors which are arranged with their light exit surfaces 5 adjacent to or behind each other, wherein the first individual light conductors may have different symbols and/or letters and/or colours. It is therefore possible to assign to each of the first individual light conductors a second individual light conductor, whereby each of the first individual light conductors can be supplied separately with light.

Figure 3A:
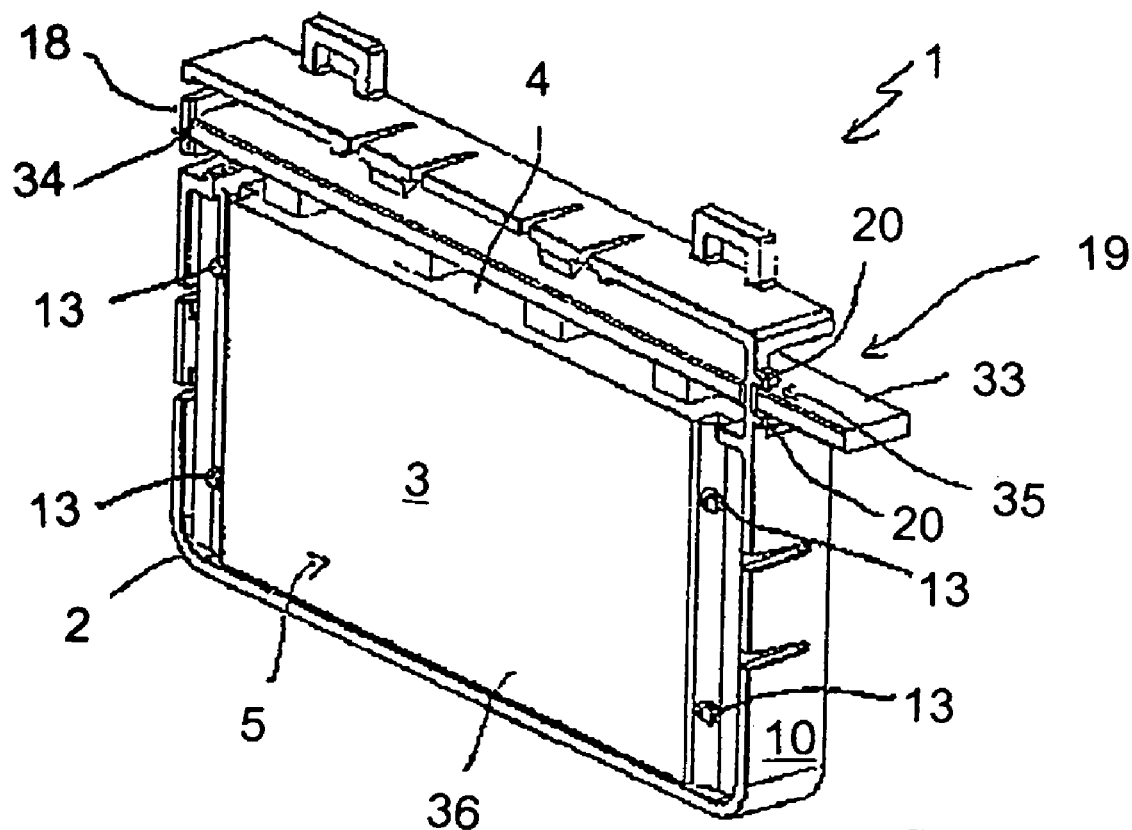
FIG. 3a shows the illuminating module from FIG. 1a with a circuit board fitted with four light emitting diodes as the illuminating element, and with a diffuser foil above the light exit surface.
Figure 3B:
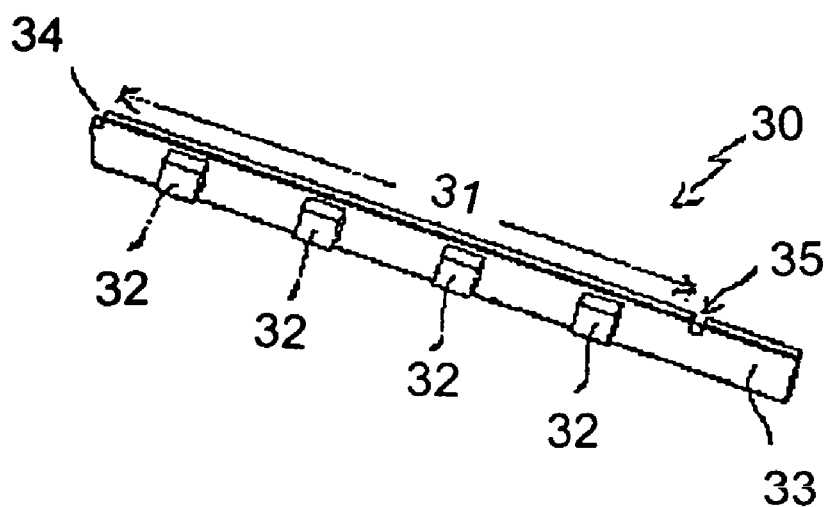

FIG. 3a shows illuminating module 1 according to FIG. 1a with a support plate 30 fitted in receiving region 14 and FIG. 3b shows support plate 30. Support plate 30 is designed as a rod-shaped circuit board and is fitted in its light discharge region 31 with four light emitting diodes 32. Support plate 30 has at one of its end a contact region 33 for electrical connections. Furthermore, support plate 30 is provided at its end opposite contact region 33 with a notch 34 and with a groove 35 between light discharge region 31 and contact region 33.

When support plate 30 is assembled in receiving region 14 of illuminating module 1 according to FIGS. 1a and 3a, support plate 30 is threaded with its contact region 33 through recess 19 of housing 2, so that contact region 33 projects laterally from housing 2 for simple electrical contacting. Sprung mounting 18 is bent from its position of rest and support 30 is pushed into receiving region 14 so that light emitting diodes 32 are able to come into direct contact with light admission surface 4 of the first light conductor. When support plate 30 is assembled, mounting 18 is engaged in notch 34 of support plate 30 and support plate 30 is engaged with its groove 35 in transverse wall 10 above recess 19 between the two retaining elements 20, so that support plate 30 is fixed in this manner in receiving region 14 of housing 2.

Support plate 30 may be designed as a rigid or flexible circuit board. Light emitting diodes 32 are able to radiate light at different times and/or indifferent colours. Furthermore, the first light conductor 3 in housing 2 may be composed of a plurality of first individual light conductors which are arranged with their light exit surfaces 5 adjacent to or behind one another, wherein the first individual light conductors may have different symbols and/or letters and/or colours. It is therefore possible to assign a light emitting diode 32 to each of the first individual light conductors, whereby each of the first individual light conductors can be supplied separately with light. To obtain a light radiation that is distributed uniformly throughout light exit surface 5, a diffuser foil 36 can be fitted over light exit surface 5 of the first light conductor 3, which foil is fixed by pins 13. As an alternative to this, the first light conductor 3 may be manufactured from material which diffusely disperses the admitted light.

Figure 4A:
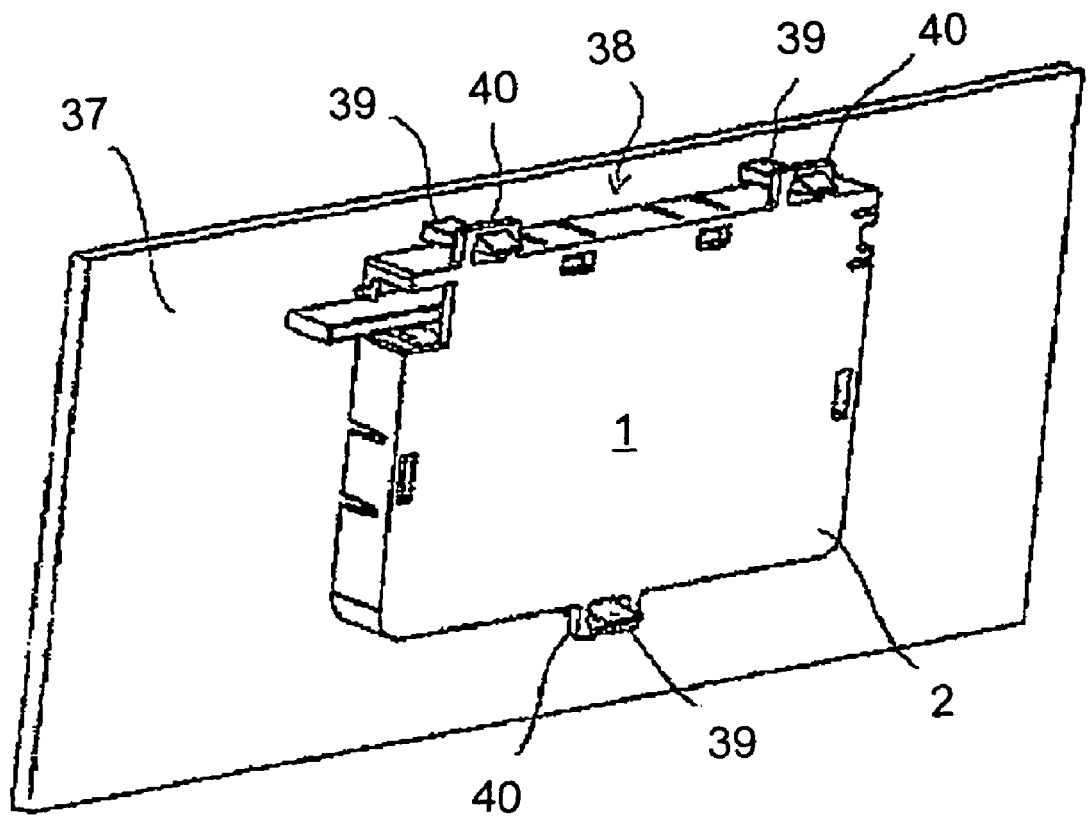
FIG. 4a shows a perspective view of the rear side of a screen of a domestic appliance with the assembled illuminating module according to FIG. 3a viewed obliquely from the rear side of the illuminating module.

FIG. 4a shows a perspective view of a screen 37 of the domestic appliance, with the assembled illuminating module 1 according to FIG. 3a, viewed obliquely from the rear of illuminating module 1. A module receiving device 38 is formed by three stop hooks 39 formed on screen 37 on the rear side of screen 37. Stop hooks 39 grip by means of stop lugs 40, which are formed on housing 2 of illuminating module 1, whereby illuminating module 1 is retained in module receiving device 38 on the one hand, and can easily be released again from module receiving device 38 on the other.

Figure 4B:
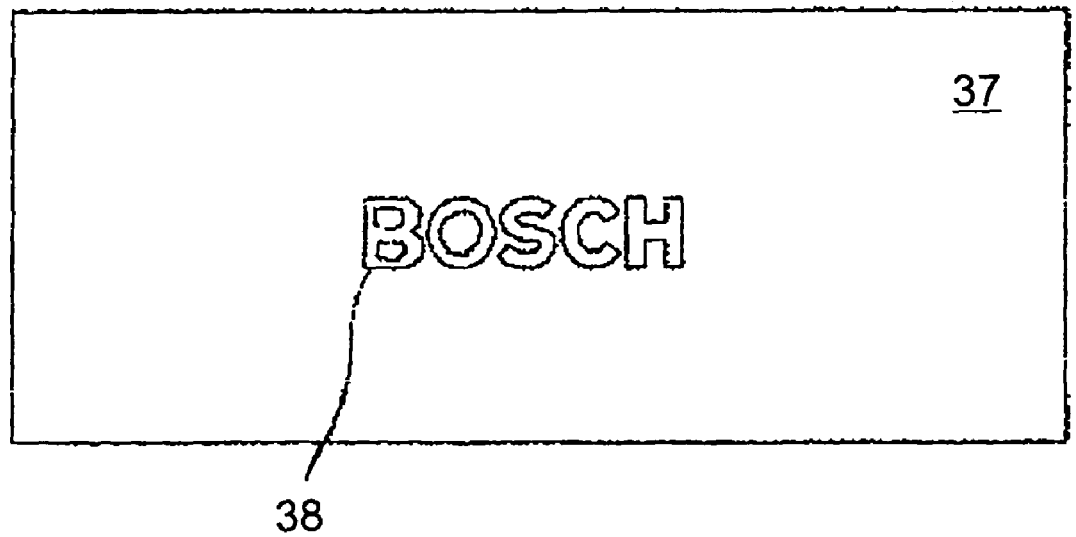

FIG. 4b shows a front view of screen 37 according to FIG. 4a. Screen 37 has recesses 38 in the form of an inscription through which the light of illuminating module 1 can be radiated. Recesses 38 can be filled with a transparent material or alternatively the inscription may be designed convexly so that it lies congruently to recesses 38 on light exit surface 5 of the first light conductor 3, so that when illuminating module 1 is assembled in module receiving device 38 the convexly designed inscription penetrates recesses 38 of screen 37 and forms with screen 37 a flat front face.

Figure 5A:
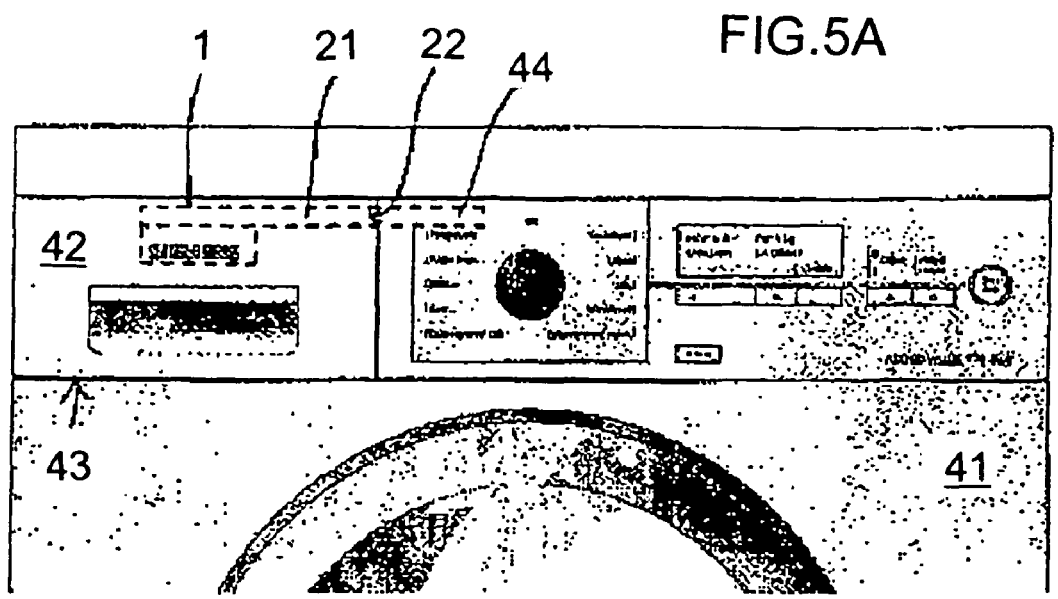

FIG. 5a shows the upper front view of a washing machine 41, with a grip plate 42 of a detergent dispenser tray 43 behind which illuminating module 1 according to FIG. 2a is mounted. The position of illuminating module 1, with the second light conductor 21, is denoted by a dotted line. The second light conductor 21 is coupled with its light coupling surface 22, to a light source 44 of washing machine 41 when detergent dispenser tray 43 is closed so that illuminating module 1 is supplied with light and the trademark "SIEMENS" is able to light up on grip plate 42 of detergent dispenser tray 43.

Figure 5B:
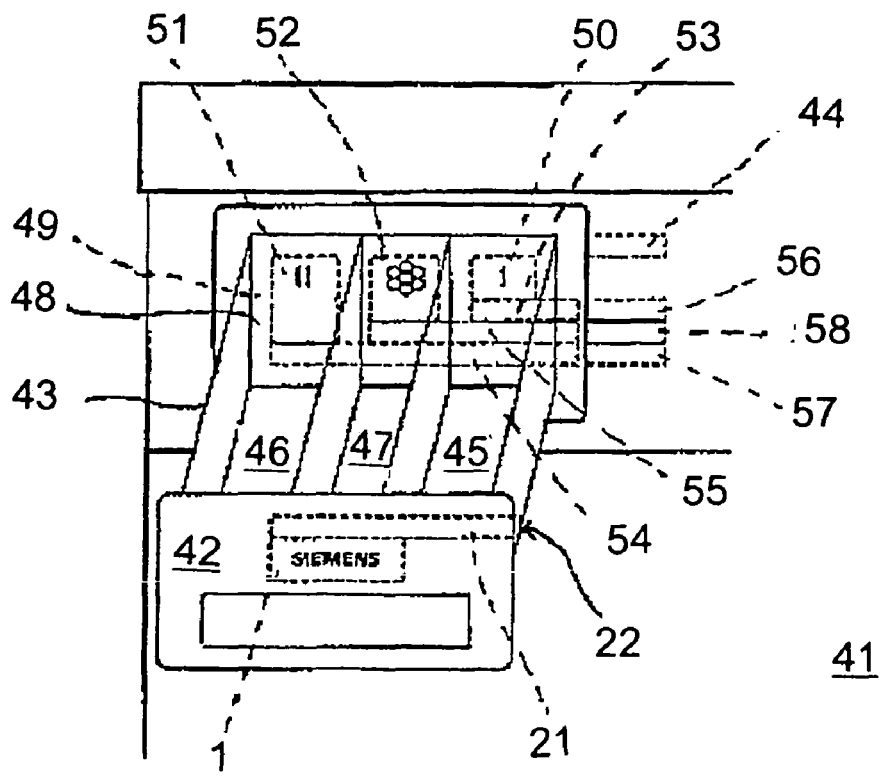
FIGS. 5b, 5c each show a perspective view of a detergent dispenser tray of the domestic appliance according to FIG. 5a, viewed oblique from above.

FIG. 5b shows diagrammatically the detergent dispenser tray 43 when extended, so that a first chamber 45 for receiving detergent for the pre-wash, a second chamber 45 for receiving detergent for the main wash and a third chamber 45 for receiving fabric softener are visible. A second illuminating module 49 is secured behind rear wall 48 of detergent dispenser tray 43. The second illuminating module 49 has a first light conductor 3 which consists of a first light radiating element 50 for the first chamber 45, a second light radiating element 51 for the second chamber 46, and a third light radiating element 52 for third chamber 47, which are arranged adjacent to each other in illuminating module 49. The second illuminating module 49 has a second light conductor 21, which consists of a first light conducting element 53 for supplying light to the first light radiating element 50, a second light conducting element 54 for supplying light to the second light radiating element 51, and a third light conducting element 55 for supplying light to the third light radiating element 52. The positions of the first, second and third light radiating elements 50, 51 and 52, with the first, second and third light conducting elements 53, 54 and 55, are denoted in FIG. 5b by dotted lines.

Rear wall 48 of detergent dispenser tray 43 has a recess in the form of a symbol for pre-wash "I" for the first chamber 45, a recess in the form of a symbol for main wash "II" for the second chamber 46, and a recess in the form of a symbol for conditioning "*" for the third chamber 47, through which recess light from illuminating module 49 can be radiated. When detergent dispenser tray 43 is open, the first light conducting element 53 couples to a first light source 56, the second light conducting element 54 to a second light source 57, and the third light conducting element 55 to a third light source 58, so that the first, second and third light radiating elements 50, 51 and 52 can be supplied with light independently of each other. The first, second and third light sources 56, 57 and 58 may, for example, be differently coloured light emitting diodes, bulbs or in turn light conductors which transmit light from a remotely arranged light source. Depending on the set washing programme, the first, second and third light sources can be switched on by a washing machine control system (not shown) before the start of the washing programme when detergent dispenser tray 43 is fully open. The symbol for pre-wash "I" therefore now lights up on rear wall 48 of detergent dispenser tray 43 when a washing programme with pre-wash is selected, so that it is indicated to a user whether the first chamber 45 must be filled with detergent or not. The same applies to the display of the symbol for conditioner.

Figure 5C:
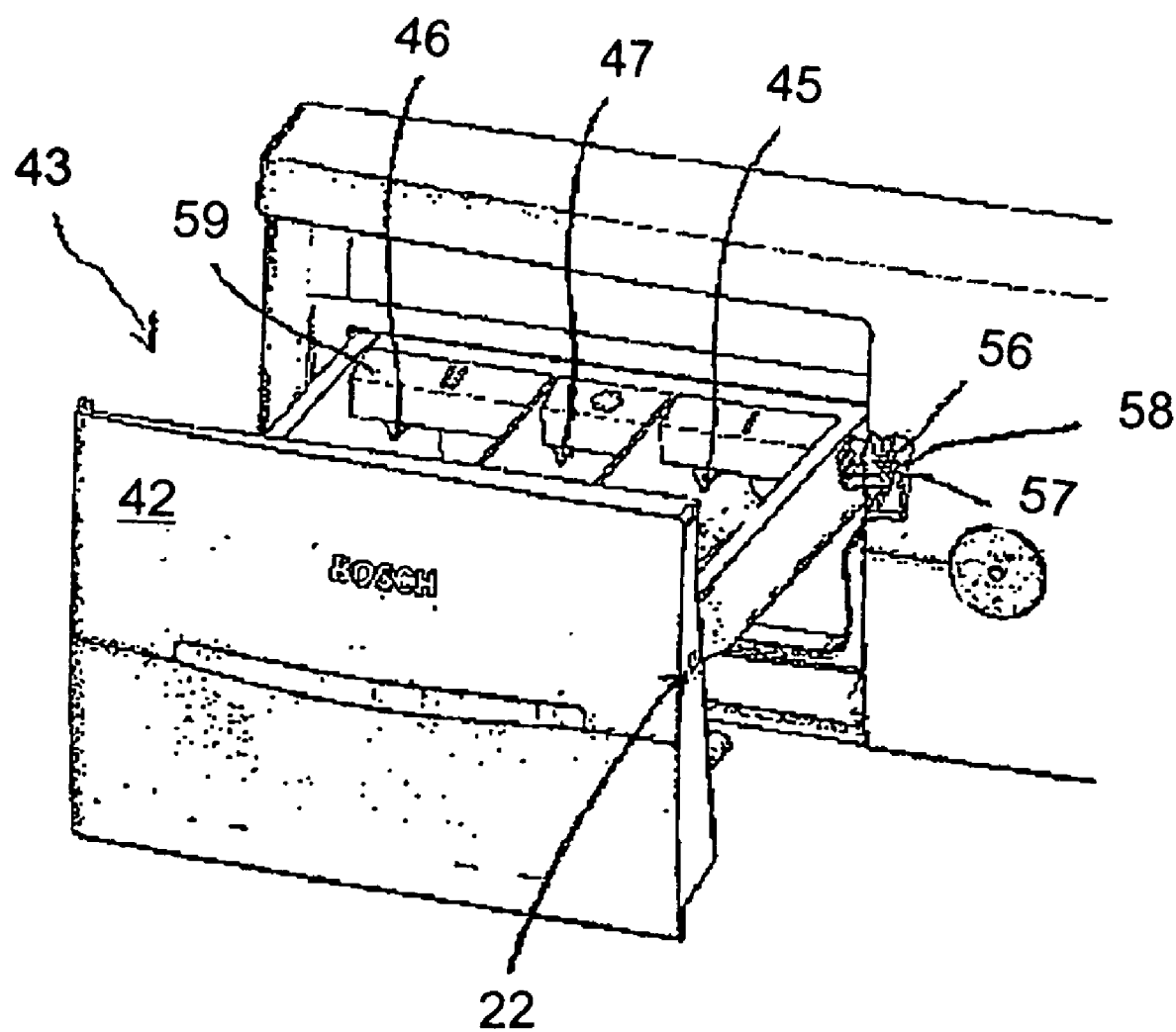

FIG. 5*c* shows an alternative design of detergent dispenser tray 43. Light coupling surface 22. Viewed from illuminating module 1 mounted behind grip plate 42 of detergent dispenser tray 43, light coupling surface 22 is shown to the side of detergent dispenser tray 43, in which light from the first, second and third light sources 56, 57 and 58 can couple when detergent dispenser tray 43 is closed. A screen 59, slightly inclined relative to the front of washing machine 41, is formed at the rear, upper end of detergent dispenser tray 43 in front of rear wall 48. This screen, inclined relative to an observer, has for the first chamber 45 the recess in the form of the symbol for pre-wash "I", for the second chamber 46 the recess in the form of the symbol for main wash "II", and for the third chamber 47 the recess in the form of the symbol for conditioning "*", so that the symbols are clearly visible to the user. The second illuminating module 49 is mounted behind this inclined screen 59, so that when detergent dispenser tray 43 is open the light of the symbols is radiated in the direction of an observer standing in front of washing machine 41.

LIST OF REFERENCE NUMBERS

1 Illuminating module
2 Housing
3 First light conductor
4 Light admission surface
5 Light exit surface
6 Rear wall of the housing
7 First longitudinal wall of the housing
8 Second longitudinal wall of the housing
9 First transverse wall of the housing
10 Second transverse wall of the housing
11 Stop element
12 Guiding element
13 Pin
14 Receiving region for an illuminating element
15 Stop element
16 Stop nose
17 Arc-shaped groove of the stop nose
18 Sprung mounting
19 Recess
20 Retaining element
21 Second light conductor
22 Light coupling surface
23 End face
24 Light uncoupling surface
25 Rear surface of the second light conductor
26 Light supply region
27 Light discharge region
28 First step
29 Second step
30 Support plate
31 Light discharge region
32 Light emitting diode
33 Contact region
34 Notch
35 Groove
36 Diffuser foil
37 Screen
38 Module receiving device
39 Stop hook
40 Stop lug
41 Washing machine
32 Grip plate
43 Detergent dispenser tray
44 Light source
45 First chamber
46 Second chamber
47 Third chamber
48 Rear wall of the detergent dispenser tray
49 Illuminating module
50 First light radiating element
51 Second light radiating element
52 Third light radiating element
53 First light conducting element
54 Second light conducting element
55 Third light conducting element
56 First light source
57 Second light source
58 Third light source
59 Inclined screen

We claim:

1. An illuminating module for mounting in a domestic appliance, the illuminating module comprising:
    either a first illuminating element or
    a second illuminating element being different from said first illuminating element;
    a housing including a receiving region configured to alternately receive one of said first illuminating element and said second illuminating element, said receiving region configured to receive only one of said first illuminating element and said second illuminating element at a time; said housing including a spring-mounted stop element with which said first illuminating element is releasably secured in the receiving region and a second spring-mounted stop element with which said second illuminating element is releasably secured in the receiving region
    the illuminating module with said first illuminating element received in said receiving region functioning as a passive illuminating module with said first illuminating element receiving light directed to it from a remote light source, and, alternately, the illuminating module with said second illuminating element received in said receiving region functioning as an active illuminating module with its own light source; and
    a first light conductor disposed in said housing and having a light admission surface through which light escaping from said illuminating elements enters said first light conductor, said first light conductor having a light exit surface from which the light escapes from the illuminating module.

2. The illuminating module according to claim 1, wherein said first illuminating element has at least a second light conductor.

3. The illuminating module according to claim 1, wherein said second illuminating element has a support plate with at least one light source.

4. The illuminating module according to claim 3, wherein said support plate is a circuit board.

5. The illuminating module according to claim 1, wherein said housing is a one-piece housing.

6. The illuminating module according to claim 1, wherein said housing is a plastic molded housing.

7. The illuminating module according to claim 1, wherein said housing has at least one inner surface for reflecting light.

8. The illuminating module according to claim 1, wherein said first light conductor is parallelepiped shaped.

9. The illuminating module according to claim 8, wherein said light exit surface and said light admission surface of said first light conductor are perpendicular to each other.

10. The illuminating module according to claim 1, wherein at least one of said first illuminating element and said second illuminating element has direct contact with said light admission surface.

11. The illuminating module according to claim 1, wherein at least one of said light exit surface and a surface of said first light conductor opposite said light exit surface has a structured surface.

12. The illuminating module according to claim 1, wherein the illuminating module can be releasably secured with a module receiving device.

13. A domestic appliance, comprising:
a module receiving device; and
at least one illuminating module secured in said module receiving device, said illuminating module containing:
either a first illuminating element or
  a second illuminating element being different from said first illuminating element;
  a housing including a receiving region configured to alternately receive one of said first illuminating element and said second illuminating element, said receiving region configured to receive only one of said first illuminating element and said second illuminating element at a time; said housing including a spring-mounted stop element with which said first illuminating element is releasably secured in the receiving region and a second spring-mounted stop element with which said second illuminating element is releasably secured in the receiving region
the illuminating module with said first illuminating element received in said receiving region functioning as a passive illuminating module, with said first illuminating element receives light directed to it from a remote light source, and, alternately, the illuminating module with said second illuminating element received in said receiving region functioning as an active illuminating module with its own light source; and
a first light conductor disposed in said housing and having a light admission surface through which light escaping from said illuminating elements enters said first light conductor, said first light conductor further having a light exit surface from which the light escapes from the illuminating module.

14. The domestic appliance according to claim 13, wherein said illuminating module is releasably secured in said module receiving device.

15. The domestic appliance according to claim 13, further comprising a screen, said module receiving device is disposed behind said screen.

16. The domestic appliance according to claim 15, wherein said screen is a grip plate for a movable object that is movable on the domestic appliance.

17. The domestic appliance according to claim 16, wherein the movable object is selected from the group consisting of a detergent dispenser tray, a door, a hood and a flap.

* * * * *